US007078004B2

(12) United States Patent
Voss et al.

(10) Patent No.: US 7,078,004 B2
(45) Date of Patent: Jul. 18, 2006

(54) DIESEL OXIDATION CATALYST

(75) Inventors: Kenneth E. Voss, Somerville, NJ (US);
Joseph C. Dettling, Howell, NJ (US);
Stanley Roth, Yardley, NJ (US);
Ramesh Kakwani, Whitehouse Station, NJ (US); Yiu Kwan Lui, Parlin, NJ (US); Alexander Gorel, Hillsborough, NJ (US); Gary W. Rice, Scotch Plains, NJ (US)

(73) Assignee: Engelhard Corporation, Iselin, NJ (US)

( * ) Notice: Subject to any disclaimer, the term of this patent is extended or adjusted under 35 U.S.C. 154(b) by 62 days.

(21) Appl. No.: 10/340,402

(22) Filed: Jan. 10, 2003

(65) Prior Publication Data

US 2003/0108465 A1    Jun. 12, 2003

Related U.S. Application Data

(63) Continuation of application No. 09/345,014, filed on Jul. 2, 1999, now abandoned.

(51) Int. Cl.
*B01J 8/00* (2006.01)

(52) U.S. Cl. ............... 423/213.5; 423/212; 423/213.7; 423/239.1; 423/239.2

(58) Field of Classification Search ............. 423/239.1, 423/239.2, 212, 213.5, 213.7
See application file for complete search history.

(56) References Cited

U.S. PATENT DOCUMENTS

| | | | |
|---|---|---|---|
| 3,904,551 A | 9/1975 | Lundsager et al. ......... 252/455 |
| 4,134,860 A | 1/1979 | Hindin et al. ................ 252/466 |
| 4,189,404 A | 2/1980 | Keith et al. .................. 252/462 |
| 4,329,162 A | 5/1982 | Pitcher, Jr. .................... 55/523 |
| 4,340,403 A | 7/1982 | Higuchi et al. ................ 55/523 |
| 4,364,760 A | 12/1982 | Higuchi et al. ................ 55/523 |
| 4,403,008 A | 9/1983 | Factor ......................... 428/117 |
| 4,510,265 A | 4/1985 | Hartwig ....................... 502/330 |
| 4,519,820 A | 5/1985 | Oyobe et al. .................. 55/284 |
| 4,559,193 A | 12/1985 | Ogawa et al. ................. 264/60 |
| 4,563,414 A | 1/1986 | Ogawa et al. ............... 430/325 |
| 4,624,940 A | 11/1986 | Wan et al. ..................... 50/251 |
| 4,708,946 A | 11/1987 | Ohata et al. ................. 502/304 |
| 4,714,694 A | 12/1987 | Wan et al. ................... 502/304 |
| 4,727,052 A | 2/1988 | Wan et al. ................... 502/327 |
| 4,902,487 A | 2/1990 | Cooper et al. ............ 423/215.5 |
| 4,927,799 A | 5/1990 | Matsumoto et al. ........ 502/303 |
| 5,053,378 A | 10/1991 | Blanchard et al. .......... 502/304 |
| 5,057,483 A | 10/1991 | Wan ........................... 502/304 |
| 5,089,237 A | 2/1992 | Schuster et al. ............. 422/180 |
| 5,100,632 A | 3/1992 | Dettling et al. .......... 423/213.5 |
| 5,157,007 A | 10/1992 | Domesle et al. ............... 502/66 |
| 5,330,945 A | 7/1994 | Beckmeyer et al. ........... 502/66 |
| 5,491,120 A | 2/1996 | Voss et al. ................... 502/304 |
| 5,597,771 A | 1/1997 | Hu et al. ..................... 502/304 |
| 5,627,124 A | 5/1997 | Farrauto et al. ............. 502/304 |
| 5,753,580 A | 5/1998 | Hayashi et al. ............. 502/304 |
| 5,898,014 A | 4/1999 | Wu et al. .................... 502/302 |
| 6,051,040 A * | 4/2000 | Peter-Hoblyn ................ 44/358 |
| 2003/0124037 A1* | 7/2003 | Voss et al. ................... 422/177 |

FOREIGN PATENT DOCUMENTS

| | | |
|---|---|---|
| DE | 33 37 903 A1 | 5/1985 |
| DE | 42 26 111 A1 | 2/1994 |
| DE | 42 26 112 A1 | 2/1994 |
| DE | 41 05 534 C2 | 12/1994 |
| EP | 0 499 931 A1 | 8/1992 |
| EP | 0 499 931 B1 | 6/1995 |
| EP | 0 835 684 A2 | 4/1998 |
| JP | 57117326 | 4/1982 |
| JP | 61286513 | 12/1986 |
| JP | 63242324 | 10/1988 |
| JP | 7-119444 | * 5/1995 |
| JP | 119444 | 5/1995 |
| JP | 09079024 | 3/1997 |
| JP | 9079024 | 3/1997 |
| JP | 09222009 | 8/1997 |
| JP | 9222009 | 8/1997 |
| WO | WO 93/10885 | 6/1993 |
| WO | WO 93/10886 | 6/1993 |
| WO | WO 94/01926 | 1/1994 |
| WO | WO 94/22564 | 10/1994 |
| WO | WO 00/29726 | 5/2000 |

OTHER PUBLICATIONS

U.S. Appl. No 09/345,014, filed Jul. 2, 1999, Voss et al.
U.S. Appl. No. 09/191,603, filed Nov. 13, 1998, Voss et al.
SAE 950747—Abatement of NOx From Diesel Engines: Status And Technical Challenges, Feeley, et al. Feb. 27-Mar. 2, 1995.

(Continued)

*Primary Examiner*—Christina Johnson
(74) *Attorney, Agent, or Firm*—Richard A. Negin

(57) ABSTRACT

The present invention relates to a method and article for treating a diesel engine exhaust stream. The stream is contacted with an upstream catalytic composition having a cerium component and/or a zeolite component to reduce the quantity and amount of the particulate matter in the exhaust stream. The stream passes from the upstream catalytic composition to a particulate filter located downstream from the upstream catalytic composition.

24 Claims, 3 Drawing Sheets

OTHER PUBLICATIONS

JSAE Review 16 (1995)(Japan) pp. 21-25. Iwamoto, et al.—NOx Reduction Characteristics of PT-ZSM-5 Catalyst With Diesel Engine Exhaust.

Catalysis Letters 27 (1994) pp. 177-186, Burch, et al.—An Investigation of the Mechanism of the Selective Catalytic Reduction of No On Various Metal/ZSM-5 Catalysts: Reactions of H2/NO Mixtures.

D.W. Breck—Zeolite Molecular Sieves, Structure, Chemistry, and Use, pp. 529-592, John Wiley & Sons, New York 1974.

Studies in Surface Science and Catalysis, vol. 33, Ed. Delmon and Yates, Elsevier, Amsterdam-Oxford-New York-Tyoko, 1987—Synthesis Of High-Silica Aluminosilicate Zeolites, P.A. Jacobs and J.A. Martens.

Catalytic Materials, American Chemical Society 1984, (0097-6156/84/0248-0157), pp. 157-200, The Preparation and Characterization of Aluminum-Deficient Zeolites, J. Scherzer.

* cited by examiner

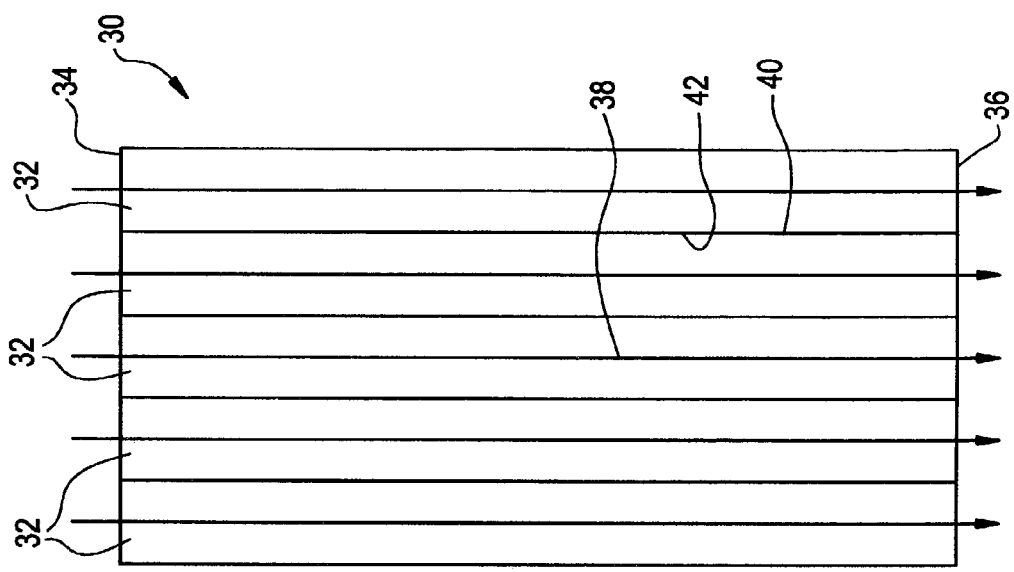
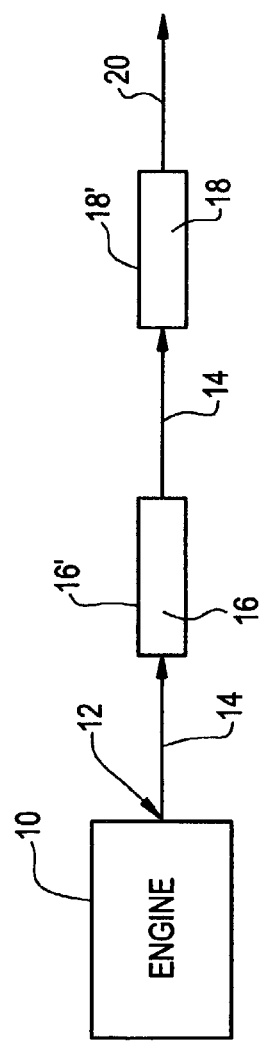

Balance Point Temperatures as a Function of Engine Speed for Various Soot Filter Configurations Bench Reactor Test Results Showing NO Conversion to $NO_2$ for Various Flow-Thru DOC Samples Without $SO_2$ in the Feed Gas Bench Reactor Test Results Showing NO Conversion to $NO_2$ for Various Flow-Thru DOC Samples With 20 ppm $SO_2$ in the Feed Gas

DIESEL OXIDATION CATALYST

This is a continuation of application Ser. No. 09/345,014, filed Jul. 2, 1999, now abandoned.

BACKGROUND OF THE INVENTION

1. Field of the Invention

The present invention relates to a catalyst composition and method of using the same for the treatment of gas streams such as diesel engine exhaust streams by the oxidation of oxidizable components, such as hydrocarbons and carbon monoxide, reduction of nitrogen oxides of exhaust gases, and the reduction of volatile organic materials and organic particulates and other pollutants prior to being discharged to the atmosphere.

2. Background and Related Art

Diesel engine exhaust is a heterogeneous material which contains gaseous pollutants such as carbon monoxide ("CO") and unburned hydrocarbons ("HC"), and nitrogen oxides as ("NOx") as well as soot particles which comprise both a dry, solid carbonaceous fraction and a soluble organic fraction. The soluble organic fraction ("SOF") is sometimes referred to as a volatile organic fraction ("VOF"), which terminology will be used herein. The VOF may exist in diesel exhaust either as a vapor or as an aerosol (fine droplets of liquid condensate) depending on the temperature of the diesel exhaust. Additionally, the VOF can be adsorbed onto the solid carbonaceous fraction.

A method of pollution abatement relates to the filtering of particulate material from diesel engine exhaust gases using a filter which can be catalyzed. A filter disclosed in the art is a wallflow filters. Such wallflow filters can comprise catalysts on or in the filter to filter and burn off filtered particulate matter. A common construction is a multi-channel honeycomb structure having the ends of alternate channels on the upstream and downstream sides of the honeycomb structure plugged. This results in checkerboard type pattern on either end. Channels plugged on the upstream or inlet end are opened on the downstream or outlet end. This permits the gas to enter the open upstream channels, flow through the porous walls and exit through the channels having open downstream ends. The gas to be treated passes into the catalytic structure through the open upstream end of a channel and is prevented from exiting by the plugged downstream end of the same channel. The gas pressure forces the gas through the porous structural walls into channels closed at the upstream end and opened at the downstream end. Such structures are primarily disclosed to filter particles out of the exhaust gas stream. Often the structures have catalysts on or in the substrate which enhance the oxidation of the particles. Typical patents disclosing such catalytic structures include U.S. Pat. Nos. 3,904,551; 4,329,162; 4,340,403; 4,364,760; 4,403,008; 4,519,820; 4,559,193; and 4,563,414.

Oxidation catalysts comprising a platinum group metal dispersed on a refractory metal oxide support are known for use in treating the exhaust of diesel engines in order to convert both HC and CO gaseous pollutants and particulates, i.e., soot particles, by catalyzing the oxidation of these pollutants to carbon dioxide and water.

U.S. Pat. No. 4,510,265 describes a self-cleaning diesel exhaust particulate filter which contains a catalyst mixture of a platinum group metal and silver vanadate, the presence of which is disclosed to lower the temperature at which ignition and incineration of the particulate matter is initiated. Filters are disclosed to include thin porous walled honeycombs (monoliths) or foamed structures through which the exhaust gases pass with a minimum pressure drop. Useful filters are disclosed to be made from ceramics, generally crystalline, glass ceramics, glasses, metals, cements, resins or organic polymers, papers, textile fabrics and combinations thereof.

U.S. Pat. No. 5,100,632 also describes a catalyzed diesel exhaust particulate filter and a method of removing deposits from the exhaust gas of a diesel engine. The method involves passing the exhaust gases through a catalyzed filter having porous walls where the walls have thereon as a catalyst a mixture of a platinum group metal and an alkaline earth metal. The catalyst mixture is described as serving to lower the temperature at which ignition of collected particulate matter is initiated.

U.S. Pat. No. 4,902,487 is directed to a process wherein diesel exhaust gas is passed through a filter to remove particulate therefrom before discharge. Particulate deposited on the filter is combusted. According to the disclosure the particulate is combusted with a gas containing $NO_2$. It is disclosed that the $NO_2$ is catalytically generated in the exhaust gas before it is passed downstream to the filter on which diesel particulate is entrapped. The $NO_2$ oxidant serves to effectively combust the collected particulate at low temperature and thus reduce the back pressure normally caused by particulate disposition on the filter. It is disclosed that, there should be enough $NO_2$ in the gas fed to the filter to effectively combust the deposited carbon soots and like particulates. Catalysts known to form $NO_2$ from NO are disclose to be useful. Such catalysts are disclosed to include platinum group metals such as Pt, Pd, Ru, Rh or combinations thereof, and platinum group metal oxides. The downstream filter can be any conventional filter. In a specific embodiment, a ceramic honeycomb monolith is coated with an alumina washcoat carrying a Pt catalyst. A particulate filter is downstream of the monolith. Carbonaceous particulate is disclosed to be combusted at a temperature generally in the order of 375° C. to 500° C. EPO 835 684 A2 discloses a system wherein the upstream catalyst is followed by a downsteam catalyzed flow-through monolith. Although U.S. Pat. No. 4,902,487 discloses benefits to making $NO_2$, U.S. Pat. No. 5,157,007 teaches suppressing $NO_2$ due to the fact that the toxicity of $NO_2$ exceeds that of NO.

U.S. Pat. No. 4,714,694 discloses alumina stabilized ceria catalyst compositions. There is disclosed a method of making a material which includes impregnating bulk ceria or a bulk ceria precursor with an aluminum compound and calcining the impregnated ceria to provide an aluminum stabilized ceria. The composition further comprises one or more platinum group catalytic components dispersed thereon. The use of bulk ceria as a catalyst support for platinum group metal catalysts other than rhodium, is also disclosed in U.S. Pat. No. 4,727,052 of C. Z. Wan, et al. and in U.S. Pat. No. 4,708,946 of Ohata, et al.

U.S. Pat. No. 5,597,771 discloses the use of ceria in catalyst compositions both in bulk form, as a particulate material, and in intimate contact with the various components of the catalyst composition. The intimate contact can be accomplished by combining a ceria containing component with at least some of the other components as a soluble cerium salt. Upon application of heat, such as by calcining the cerium salt becomes ceria.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution. A co-formed (e.g., co-precipitated) ceria oxide-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 5,491,120 discloses oxidation catalysts containing ceria and a bulk second metal oxide which may be one or more of titania, zirconia, ceria-zirconia, silica, alumina-silica and alpha-alumina.

U.S. Pat. No. 5,627,124 discloses oxidation catalysts containing ceria and alumina. It is disclosed that each have a surface area of at least about 10 $m^2/g$. The weight ratio of ceria to alumina is disclosed to be 1.5:1 to 1:1.5. It is further disclosed to optionally include platinum. The alumina is disclosed to preferably be activated alumina. U.S. Pat. No. 5,491,120 discloses oxidation catalysts containing ceria and a bulk second metal oxide which may be one or more of titania, zirconia, ceria-zirconia, silica, alumina-silica and alpha-alumina.

The prior art also shows an awareness of the use of zeolites, including acidic zeolites and metal-doped zeolites, to treat diesel exhaust. European Patent 0 499 931 B 1 is directed to the use of a catalyst for reducing the quantity and/or size of particles and exhaust gases of diesel engines. This catalyst is characterized in using zeolites such as faujasite, pentasil or mordenite with acidic properties to crack to long chain and aromatic hydrocarbons. This patent claims priority from German Patent DE 4105534C2 which discloses the use of acidic zeolites to crack long chain hydrocarbons. Additionally, DE 4226111A1 and DE 4226112A1 are patents which also disclose the use of acidic zeolites. In DE 4226111A1, noble metal and acid zeolites are disclosed as a composition to use catalyze the reduction of mass and/or size of particles. DE 4226112A1 discloses compositions using transitional metal oxide and an acid zeolite for similar reasons. U.S. Pat. No. 5,330,945 discloses a catalyst treatment of diesel exhaust particles. Such a composition is includes a zeolite having exchangeable cations at cationic sites in combination with silica and very fine particles of catalytic metal. The goal, here again, is to permit penetration of hydrocarbons to be cracked and oxidized.

WO 94/22564 discloses a catalyst composition for treating diesel exhaust which includes ceria and optionally alumina as well as a Beta zeolite. A platinum group metal is employed to promote oxidation of CO and HC while limiting the conversion of $SO_2$ to $SO_3$.

WO 94/01926 entitled, "Improved Zeolite-Containing Oxidation Catalyst and Method of Use" discloses catalyst compositions for treating a diesel engine exhaust stream containing a volatile organic fraction. A catalyst composition comprises a refractory carrier on which is disposed a coating of a catalytic material comprising a catalytically effective amount of ceria having a BET surface area of at least about 10 $m^2/g$ and a catalytically effective amount of a zeolite. It is also known to employ ceria and alumina as a support for a platinum group metal as a dual exhaust catalyst. The zeolite can be doped with a platinum group metal. In this composition the zeolite is employed to serve both to catalyze the oxidation of VOF and to crack the larger VOF molecules and, during period of relatively low temperature operation, to trap gas-phase hydrocarbons within the zeolite pores. If the zeolite has been doped with one or more catalytic metals or hydrogen, the trapped gas-phase hydrocarbons are brought into intimate contact with the catalytically active cations which facilitates oxidation of the hydrocarbons.

References of interest also include Feeley, et al., ABATEMENT OF NOX FROM DIESEL ENGINES; STATUS AND TECHNICAL CHALLENGES, SAE #950747; M. Iwamoto, et al., JSAE (Japan) Review, 16, pp 21–25 (1995); and Burch, et al., AN INVESTIGATION OF THE MECHANISM OF THE SELECTIVE CATALYTIC REDUCTION OF NO ON VARIOUS METAL/ZSM-5 CATALYSTS: REACTION OF H2/NO MIXTURES" Catal. Lett., 27, pp 177–186 (1994).

SUMMARY OF THE INVENTION

The present invention relates to a method and related article for treating a diesel engine exhaust stream containing nitrogen oxides, carbon monoxide, gaseous hydrocarbons and particulate matter. The method comprises contacting the stream with an upstream catalytic composition comprising at least one upstream catalytic component selected from the group consisting essentially of a cerium component and a zeolite component to reduce the quantity and amount of the particulate matter. A useful catalytic component comprises a combination of a cerium component and a zeolite component. The stream can then be passed from the upstream catalytic composition to a particulate filter located downstream from the upstream catalytic composition.

The upstream catalyst component can further comprise a precious metal catalyst component to reduce at least some of the nitrogen oxides to nitrogen in the presence of the precious metal component and oxidize some of the hydrocarbons and carbon monoxide.

The article of the present invention comprises a diesel engine having an exhaust outlet. There is an exhaust conduit with the exhaust outlet defining the upstream end of the exhaust conduit. The conduit extends to the outlet of the exhaust pipe. The upstream catalytic composition is in the exhaust conduit and the particulate filter is in the exhaust conduit downstream from the upstream catalytic composition. The upstream catalytic composition can be on a suitable carrier located in an upstream container or "can". The downstream filter can be located in a separate downstream container or can from the upstream catalytic composition. In an alternative embodiment the upstream catalytic composition on a suitable carrier can be located in the same can as the downstream filter.

The present invention can reduce the size and amount of particulate matter when the composition contains only minor amount or essentially no precious metal catalytic component. This is accomplished by the use of the upstream catalytic composition at least one upstream catalytic component selected from the group consisting essentially of a cerium component and a zeolite component. The upstream catalyst can be located as a washcoat on a flow through carrier located upstream of the filter. The upstream catalyst accumulates little particulate matter and reduces the size and amount of particulate matter going to the downstream filter.

The downstream filter is preferred to be a catalytic filter, preferably a catalyzed wallflow filter. The filter catalyst on the downstream filter can be designed to catalytically eliminate particulate matter by processes such as catalytic oxidation. The use of the upstream catalyst of the present invention has been found to significantly reduce the balance point temperature (defined below) of the catalyzed filter. The filter catalyst comprises at least one catalytically active material such as known in the art with preferred filter catalysts at least one catalytically active material comprising selected from cerium components, zeolite components, and platinum group metal components. Preferably, the filter catalyst comprises a precious metal oxidation filter catalyst based composition. Useful precious metal components for the filter catalyst include at least one platinum group metal component is selected from platinum; palladium; rhodium; iridium and mixtures thereof, with most preferred being platinum, palladium and rhodium.

Zeolites useful as the upstream catalytic component, as well as in the catalyzed filter, can be characterized by general formula:

$$M^1n[mM^2O_2 \cdot nSiO_2] \cdot qH_2O \qquad (I)$$

in which $M^1$ is an equivalent of an exchangeable cation corresponding in number to the $M^2$ component;

$M^2$ is a trivalent element which, together with the Si, forms the oxidic skeleton of the zeolite;

n/m is the $SiO_2$ to $M^2O_2$ ratio and q is the quantity of absorbed water.

$M^2$ can comprise at least one metal selected from the group consisting of Al, B Ga, In, Fe, Cr, V, As and Sb and $M^1$ can be selected from the group consisting of hydrogen and at least one metal selected from the group consisting of Li, Na, K, Rb, Cs, Mg, Ca, Sr, Ba, Cr, Mn, Fe, Co, Ni, Cu, Nb, Ma, Ta, W, Re, Pt, Pd, and Rh.

In specific embodiments $M^1$ can be selected from the group consisting of hydrogen and at least one metal selected from the group consisting of Rh and Pt. $M^2$ can comprise at least one metal selected from the group consisting of Al, B, Ga, In, Fe, Cr, and $M^1$ is selected from the group consisting of hydrogen and at least one metal selected from the group consisting of Rh and Pt. $M^2$ is preferably Al.

Preferred zeolites include beta, faujasites, pentasils and mordenites with a useful zeolites being beta zeolite, ZSM-5 and zeolite Y.

In other specific embodiments up to 100% of the $M^1$ can comprises hydrogen ion. In a preferred embodiment the zeolites are acids. Such zeolites of the above mentioned structural types in which at least part of the metal cations have been replace by hydrogen ions. Preferably 50–100%, particularly preferred 80–100% of all of the $M^1$ metals can be replaced by hydrogen ions.

An advantage of a specific embodiment is having essentially no precious metal in the upstream catalyst composition. In this embodiment $M^2$ comprises a trivalent metal and $M^1$ comprises substantially no precious metal.

A useful and preferred upstream catalyst composition comprises a cerium component. A useful embodiment of the cerium component comprises ceria which can be in a suitable form, preferably in bulk form (defined below).

The upstream catalyst can comprise a various other components including at least one compound selected from alumina, titania, zirconia, alkaline earth metal oxides, rare earth oxides and transition metal oxides. The upstream catalyst composition can comprises a support component such as a refractory oxide which can be selected from titania, zirconia, and silica containing components. Optionally, at least one precious metal component is located on the support component. Useful precious metal components for the upstream catalyst include at least one platinum group metal component is selected from platinum; palladium; rhodium; iridium and mixtures thereof, with most preferred being platinum, palladium and rhodium.

The upstream catalyst composition can further comprises at least one base metal component separate from the zeolite. The base metal can comprise an oxide selected from the group consisting of alumina, titania and zirconia, with alumina preferred.

The recited catalyst compositions are supported on a catalyst carrier, also referred to as a substrate. Preferred carriers useful to support the upstream catalyst composition can be selected from flowthrough, foam and mesh substrates. The most preferred upstream carrier is a flowthrough carrier which is preferably metallic or a refractory ceramic and has a plurality of parallel exhaust flow passages extending therethrough and defined by passage walls on which the upstream catalyst composition is coated. Useful filters include: wallflow filters; foam filters; wound fiber filters; ceramic fiber felt, knit or weave filters; and mesh filters, with a wallflow filter being preferred.

BRIEF DESCRIPTION OF THE DRAWINGS

FIG. 1 is a schematic view of the article of the present invention.

FIG. 2 is a sectional view of a portion of a wallflow honeycomb wall.

DESCRIPTION OF THE PREFERRED EMBODIMENTS

Figure 4:
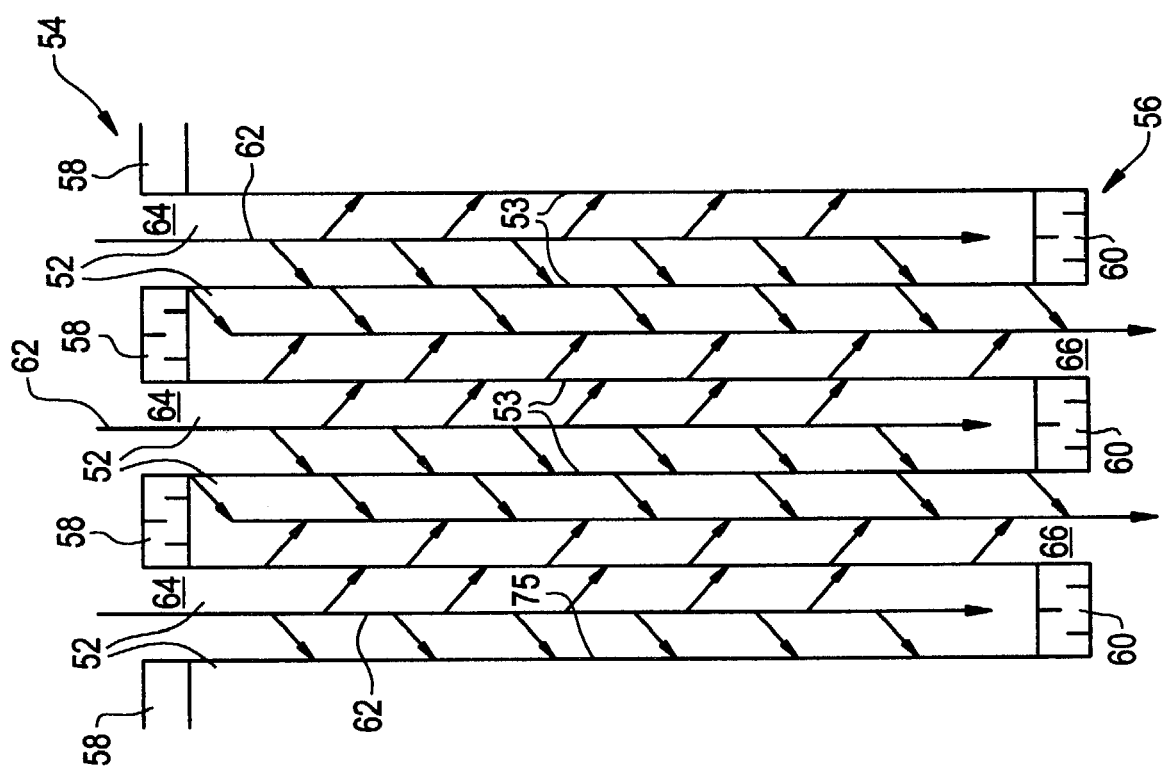
FIG. 4 is a partial, sectional view of the element showing the alternate plugged channels.

The present invention relates to an article comprising an upstream catalyst and a downstream filter, preferably catalyzed, and a related method which is effective for treating diesel engine exhaust, particularly with regard to reducing the total particulates and gaseous hydrocarbons (HC), carbon monoxide (CO) and nitrogen oxides (NOx) content of the exhaust.

The carbonaceous particulates ("soot") component of diesel engine exhaust is, as discussed above, known to be comprised of relatively dry carbonaceous particulates and a volatile organic fraction ("VOF") comprising high molecular weight hydrocarbons, typically greater than $C_9$ and usually ranging from $C_{12}$–$C_{50}$ resulting from unburned and partially burned diesel fuel and lubricating oil. The VOF is present in the diesel exhaust as either a vapor phase or a liquid phase, or both, depending on the temperature of the exhaust. Additionally, the VOF can be adsorbed onto the solid carbonaceous fraction.

In order to reduce the total particulates discharged, the volatile organic fraction, or at least a portion thereof, must be oxidized to innocuous $CO_2$ and $H_2O$ by being contacted with an oxidation catalyst under suitable reaction conditions. The gaseous pollutants, including HC, CO and NOx can be catalytically treated. The gaseous hydrocarbons (typically $C_2$ to $C_6$ containing hydrocarbons) can be oxidized to $CO_2$ and $H_2O$, and the nitrogen oxides reduced to form nitrogen ($N_2$).

The article of the present invention, when employed as a diesel exhaust treatment catalyst, is effective for effectuating a reduction in total particulates, and are also capable especially with the addition of a platinum group metal component and/or other catalytic metals as described below, of providing the added advantage of oxidizing a portion of the HC and CO and reducing a portion of the NOx contained in the gaseous component of the diesel engine exhaust. This is accomplish while minimizing the production of $NO_2$ in the upstream catalyst. In preferred embodiments little or no $NO_2$ is produced in the system as a result of the upstream catalyst while at the same time achieving a lower balance point temperature.

Definitions

As used herein and in the claims, the following terms shall have the indicated meanings.

The term "activated alumina" has its usual meaning of a high BET surface area alumina, comprising primarily one or more $\gamma$-, $\theta$- and $\delta$-aluminas (gamma, theta and delta).

"Balance point temperature (BPT)" means the exhaust gas inlet temperature to a catalyzed filter at which the amount of particulate matter flowing into a catalyzed particulate filter is equal to the amount of particulate matter which is converted to nonparticulate components on the catalyzed filter. That is, the rate of particulate burning in the filter is equal to the rate of particulate accumulation in the filter. Stated another way, it is the temperature at which the catalyzed filter does not accumulate particulate matter or is "self-generating". BPT can be related to the pressure drop ($\Delta P$) across the filter over time.

"BET surface area" has its usual meaning of referring to the Brunauer, Emmett, Teller method for determining surface area by $N_2$ adsorption. Unless otherwise specifically stated, all references herein to the surface area of a ceria, alumina or other component refer to the BET surface area.

"Bulk" as referred to herein or in the claims with regard to ceria or alumina being in "bulk" form means that the ceria or alumina is present as discrete particles (which may be, and usually are, of very small size, e.g., 10 to 20 microns in diameter or even smaller) as opposed to having been dispersed in solution form into another component. For example, the thermal stabilization of ceria particles (bulk ceria) with alumina as described in U.S. Pat. No. 4,714,694, results in the alumina being dispersed into the ceria particles and does not provide the dispersed alumina in "bulk" form, i.e., as discrete particles of alumina.

"Catalytically effective amount" means that the amount of material present is sufficient to affect the rate of reaction of the oxidation or reduction of pollutants in the exhaust being treated.

"Doped" used to refer to a zeolite being doped with a metal or hydrogen, and the terms "dope" or "doping" used in the same context, means that the metal or hydrogen moiety is incorporated within the pores of the zeolite, as distinguished from being dispersed on the surface of the zeolite but not to any significant degree within the pores of the zeolite. Doping of a zeolite is preferably carried out by known ion-exchange techniques in which a zeolite is repeatedly flushed with a solution containing metal cations (or an acid to provide hydrogen ions), or the zeolite pores are flooded with such solution. However, the defined terms include any suitable technique for incorporating a catalytic moiety, e.g., one or more metals as ions or neutral metal-containing species or hydrogen ions, within the pores of the zeolite, especially by exchange or replacement of cations of the zeolite.

"Gas Hourly Space Velocity" (GHSV) gas volumetric flow at standard conditions (1 atm., Rm T 300 degrees Kelvin) divided by volume of the reactor which is the total volume of catalyst including the carrier on an hourly basis. E.g. for a honeycomb carrier, the total volume of the honeycomb is used.

"Inlet temperature" shall mean the temperature of the exhaust, test gas or other stream being treated immediately prior to initial contact of the exhaust, test gas or other stream with a process unit such as catalytic component or filter.

"Washcoat" refers to a thin, adherent coating of a material, such as the catalytic material of the present invention, disposed on the walls forming the parallel gas flow passages of a carrier, which is typically made of a refractory material such as cordierite or other oxide or oxide mixture, or a stainless steel.

When the compositions are applied as a coating to a monolithic carrier substrate, the "washcoat loading" refers to proportions of ingredients conventionally expressed as grams of material per cubic inch of the catalyst and the substrate, except for precious metal components are conventionally expressed as grams of material per cubic foot of the catalyst and the substrate. This measure accommodates different gas flow passage cell sizes in different monolithic carrier substrates. Platinum group metal components are based on the weight of the platinum group metal.

Article

A preferred embodiment of the article of the present invention will be understood by reference to FIGS. 1–4.

The article of the present inventions comprises a diesel engine 10 having an exhaust outlet 12. There is an exhaust conduit 14 with the exhaust outlet 12 defining the upstream end of the exhaust conduit 14. The conduit extends to the outlet of the exhaust pipe. The upstream catalytic composition 16 is preferably located on a suitable carrier. The carrier can be mounted in an upstream container (or can) 16' in the exhaust conduit 14. The particulate filter 18 is in the exhaust conduit 14 downstream from the upstream catalytic composition 14. The downstream particulate filter 18 can be located in a separate downstream container 18' or can from the upstream catalytic composition 16. In an alternative embodiment the upstream catalytic composition 16 on a suitable carrier can be located in the same can as the downstream filter 18. There is an exhaust pipe 20 in communication with the outlet of the particulate filter 18.

The upstream catalytic carrier 16' is a flow through honeycomb which can be made of a ceramic or metallic material. Referring to FIG. 2, flow through honeycomb 30 has a plurality of channels 32. The honeycomb has an inlet end 34 and an outlet end 36. Preferably, each channel 32 is open at the inlet side 34 and open at the outlet side 36. Gases passing through the honeycomb indicated by arrows 38 enter through inlet end 34 and exit from outlet end 36. The gases pass through the channels 12. The channels have channel walls 40. The channel walls 40 are coated with a layer of catalyst composition 42 applied as recited below. The catalyst composition is preferably on each side of the channel walls 40 so that each honeycomb channel is coated with catalyst.

Figure 3:
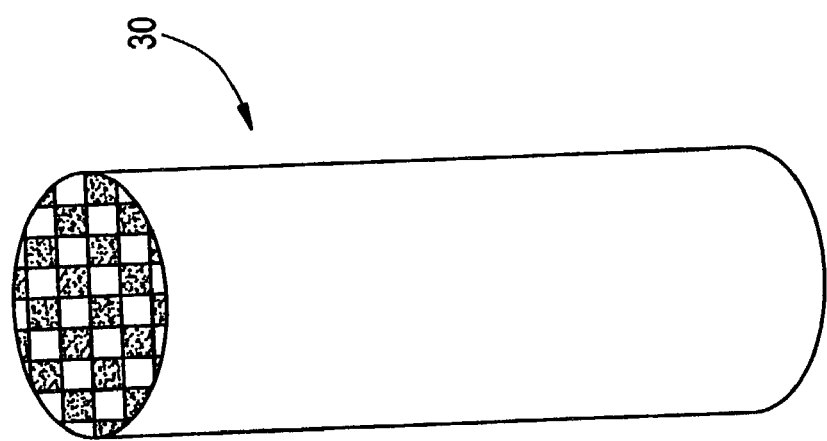
FIG. 3 is a schematic view in perspective of a wallflow catalytic honeycomb.

A preferred downstream particulate filter 18 is a wallflow filter 30 as illustrated in FIGS. 3 and 4. Alternate channels are plugged at the inlet with inlet plugs 58 and at the outlet with outlet plugs 60 to form opposing checkerboard patterns at the inlet 54 and outlet 56. A gas stream 62 enters through the unplugged channel inlet 64, is stopped by outlet plug 56 and diffuses through channel walls 53 to the outlet side 46. The gas cannot pass back to the inlet side of walls 33 because of inlet plugs 58. The inlet sides walls 53 can coated with a porous catalyst composition.

Upstream Catalytic Composition

The upstream catalytic composition comprises at least one upstream catalytic component selected from the group consisting essentially of a cerium component and a zeolite component to reduce the quantity and amount of the particulate matter. A useful catalytic component comprises a combination of a cerium component and a zeolite component.

The upstream catalytic composition of the present invention when used with a substrate such as a flowthrough honeycomb monolith preferably has a washcoat loading expressed in grams per cubic inch of from 0.5 to 5.0 and more preferably 0.5 to 3. grams per cubic inch.

Cerium Components

The upstream catalytic composition of the present invention can contain a cerium component, preferably cerium oxide (ceria). The cerium component can be present in an amount of at least 5 wt. % and preferably at least 10 wt. % and more preferably at least 15 wt. % of the upstream catalyst composition. Useful ranges include from 5 to 80, preferably 25 to 75 and more preferably 40 to 60 wt. % of the cerium component based on the upstream catalyst composition.

The cerium component can be included by dispersing methods known in the art. Such methods can include impregnation of water soluble cerium components onto the components of the upstream composition by impregnating the cerium component onto a support component, preferably forming a layer of the composition on a suitable substrate, drying and calcining the resulting mixture in air to result in a catalyst layer which contains ceria in contact with the composition components. Typically, impregnation means that there is substantially sufficient liquid to fill the pores of the material being impregnated. Examples of water soluble or dispersible, water soluble cerium components which can be used include, but are not limited to water soluble salts and/or colloidal dispersions of, cerium acetate cerium nitrate, etc. U.S. Pat. No. 4,189,404 discloses the impregnation of alumina-based support composition with cerium nitrate.

Alternatively, the cerium component can be in the form of bulk ceria. By bulk form it is meant that the ceria and/or praseodymia is present as discrete particles which may be as small as 1 to 15 microns in diameter or smaller, as opposed to having been dispersed in solution as in the first layer. A description and the use of such bulk components is presented in U.S. Pat. No. 4,714,694, hereby incorporated by reference. As noted in U.S. Pat. No. 4,727,052, also incorporated by reference, bulk form means that particles of ceria are admixed with particles of activated alumina so that the ceria is present in solid or bulk form as opposed to, for example, impregnating alumina particles with a solution of ceria compound which upon calcination is converted to ceria disposed within the alumina particles.

Useful cerium components include composites of ceria and zirconia and various rare earth components. Reference is made to U.S. Pat. Nos. 4,624,940 and 5,057,483 which refer to ceria-zirconia containing particles. Ceria can be dispersed homogeneously throughout the zirconia matrix up to 50 weight percent of the total weight of the ceria-zirconia composite to form a solid solution. A co-formed (e.g. co-precipitated) ceria oxide-zirconia particulate composite can enhance the ceria utility in particles containing ceria-zirconia mixture. The '483 patent discloses that neodymium and/or yttrium can be added to the ceria-zirconia composite to modify the resultant oxide properties as desired. Useful cerium components can contain ceria, zirconia, neodymia and praseodymium such as the composites as disclosed in U.S. Pat. No. 5,898,014.

Using a catalyst containing low amounts of ceria up to about 40 wt. %, and specifically in amount of from 1 to about 25 wt. %, and more specifically 2 to 20 wt. % and yet more specifically 2 to 15 wt. %, based on the weight of the upstream catalyst, of the ceria in an upstream composition results in a minimum to essentially no $NO_2$ formation in exhaust gas at temperatures up to about 400° C. The use of ceria at from about 2 to 10 wt. % results in forming essentially no $NO_2$ at exhaust gas inlet temperatures up to 400° C. Unexpectedly, it has been found that the use of greater than 40 wt. % of the cerium component based on the upstream catalyst composition resulted in minor amounts of $NO_2$ formation. Reference is made to the Examples 4 and 5 using ceria in amount of about 45 wt. % resulted in minor amount of $NO_2$ formation as indicated in the Examples. As indicated in the Background it may be desirable to avoid the production of $NO_2$. However, under certain circumstances, also disclosed in the Background it is disclosed that may be desirable to produce $NO_2$ in the upstream catalyst. According to the composition of the present invention, such advantages have be achieved even when forming little or no $NO_2$.

Zeolite Component

The upstream catalytic composition of the present invention can contain a zeolite component. The zeolite component can be present in an amount of at least 5 wt. % and preferably at least 10 wt. % and more preferably at least 15 wt. % of the upstream catalyst composition. Useful ranges include from 5 to 80, preferably 20 to 60 and more preferably 40 to 60 of the cerium component.

Zeolites particularly suitable for use in accordance with the invention are described in DE 41 05 534 C2, herein incorporated by reference, and include the following structure types: faujasites, pentasils, mordenites, ZSM-12, zeolite beta, zeolite L, zeolite omega, ZSM-22, ZSM-23, ZSM-48, EU-1, etc. The zeolite of the pentasil type preferably has an $SiO_2$ to $Al_2O_3$ ratio of 25 to 2000.

Zeolites can be characterized by general formula (I):

$$M^1n[mM^2O_2 \cdot nSiO_2] \cdot qH_2O \qquad (I)$$

in which $M^1$ is an equivalent of an exchangeable cation corresponding in number to the $M^2$ component;

$M^2$ is a trivalent element which, together with the Si, forms the oxidic skeleton of the zeolite;

n/m is the $SiO_2$ to $M^2O_2$ ratio and q is the quantity of absorbed water.

In terms of their basic structure, zeolites are crystalline aluminosilicates which are made up of a network of $SiO_4$ and $M^2O_4$ tetrahedrons. The individual tetrahedrons are attached to one another by oxygen bridges via the corners of the tetrahedrons and form a three-dimensional network uniformly permeated by passages and voids. The individual zeolite structures differ from one another in the arrangement and size of the passages and voids and in their composition. Exchangeable cations are incorporated to compensate the negative charge of the lattice which arises out of the $M^2$ component. The absorbed water phase $qH_2O$ is reversibly removable without the skeleton losing its structure. $M^2$ is often aluminum, although it may be partly or completely replaced by other trivalent elements.

A detailed description of zeolites can be found, for example, in the book by D. W. Breck entitled "Zeolite Molecular Sieves, Structure, Chemistry and Use", J. Wiley & Sons, New York 1974. A further description, particularly of high-silica zeolites suitable for catalytic applications, can be found in the book by P. A. Jacobs and J. A. Martens entitled "Synthesis of High-Silica Aluminosilicate Zeolite", Studies in Surface Science and Catalysis, Vol. 33, Ed. B. Delmon and J. T. Yates, Elsevier, Amsterdam-Oxford-New York-Tokyo, 1987.

In the zeolites used in accordance with the invention, $M^2$ can be one or more elements selected from the group consisting of Al, B, Ga, In, Fe, Cr, V, As and Sb, and preferably one or more elements from the group consisting of Al, B, Ga and Fe, with Al most preferred.

The exchangeable cations $M^1$ present in the zeolites mentioned may be, for example, those of K, Na, Li, Mg, Ca, Sr, Ba, Rb, Cs and also transition metal cations, such as, for example, Cr, Mn, Fe, Co, Ni, Cu, Nb, Ma, Ru, Rh, Pd, Ag, Ta, W, Re, and Pt. Cations of the rare earth group and protons are also suitable.

In specific embodiments, the zeolite is characterized by general formula (I) wherein $M^2$ comprises a trivalent metal and $M^1$ comprises substantially no precious metal. Preferably, the first zeolite is characterized by general formula (I) wherein $M^2$ comprises at least one metal selected from the group consisting of Al, B, Ga, In, Fe and $M^1$ is selected from the group consisting of hydrogen and/or at least one metal selected from the group consisting of K, Mg, Ca, Sr, Ba, Mn, Fe, Co, Ni, Cr, V and Cu. Most preferred $M^2$ is Al and most preferred $M^1$ is selected from H, Mg, Ca, Sr, Ba, Fe and Mn, with H and Fe being most preferred. More preferred, zeolites are selected from the group consisting of faujasites, pentasils, mordenites, Y and beta, with pentasils and beta most preferred. The most preferred, zeolite comprises beta zeolite. The beta zeolite can be exchanged with H and/or Fe.

In a preferred embodiment the zeolites are acidic. Such zeolites of the above mentioned structural types in which at least part of the metal cations have been replaced by hydrogen ions. Preferably 50–100%, particularly preferred 80–100% of all of the $M^1$ metals can be replaced by hydrogen ions.

The silica to alumina molar ratio may be increased, for example, by reacting the Beta zeolite with an acid. Scherzer, *The Preparation and Characterization of Aluminum-Deficit Zeolites*, Catalytic Materials, American Chemical Society 1984 (0097 6156/84/0248 0157), pp. 157–200, is directed to methods of preparation of aluminum-deficient zeolites. Three methods include thermal or hydrothermal dealumination; chemical dealumination; and a combination of thermal and chemical dealumination. While thermal or hydrothermal treatment can be used, this results in a partial framework dealumination with the aluminum remaining in the zeolite cages or channels. The preferred chemical treatment can be carried out with a variety of reagents and results in the removal of aluminum from the zeolite in a soluble or volatile form. The preferred chemical dealumination can be achieved by reacting the zeolite with a suitable reagent in solution (aqueous or nonaqueous); or by reacting the zeolite with a reagent in the vapor phase at high temperature. Preferably dealumination is accomplished in solution by reacting the zeolite with solutions of acids, salts or relating agents and most preferably acids. Useful acids include mineral acids such as sulfuric acid, hydrochloric acid and nitric acid with sulfuric acid most preferred. Breck, supra, discloses that aluminum may be removed from the framework of certain zeolites by the treatment with acids and gives examples of increasing the silicon to alumina ratio by treatment with hydrochloric acid (Breck, Supra, pp. 505–507).

The zeolite and the acid are preferably reacted at ambient temperature and pressure in a reaction vessel. The resulting reaction product is separated and washed with deionized water and filtered. The reaction product is then dried. The molar ratio of silica to alumina can be determined by known methods, preferably X-ray fluorescence. A preferred analytic procedure for determining the $SiO_2/Al_2O_3$ ratio is to calcine a sample for one hour at 1,000° C. The sample is mixed with ten parts by weight of a fluxing agent, preferably an 80/20 weight ratio of lithium metaborate to lithium tetraborate. The mixture is fused for about 5 minutes at 1,200° C. The resulting mixture in the form of a button is analyzed by X-ray fluorescence. This is done using a reference comparison.

The zeolite composition of the present invention can comprise in a mixture therewith diesel oxidation catalysts of the type known in the art such as disclosed in commonly assigned U.S. Ser. No. 08/255,289 filed Jun. 7, 1994 to Yavuz, et al.; U.S. Ser. No. 08/405,279 filed Mar. 16, 1995 to Voss, et al. and U.S. Ser. No. 08/457,557 filed Jun. 1, 1995 to Farrauto, et al. all herein incorporated by reference. Where the zeolite composition of the present invention is used in combination with an oxidizing composition, the zeolite composition can comprise from 10 to 90, preferably from 20 to 70, more preferably 30 to 60 percent of the combined composition.

Using a catalyst containing zeolite at about 40 wt. %, and about 5 wt. % ceria resulted in essentially no $NO_2$ formation in exhaust gas at temperatures up to about 350° C. and only minor $NO_2$ formation up to about 400° C.

Binder

The composition of the present invention optionally, and preferably contains a binder. Preferred binders are alumina, silica, silica-alumina and zirconia. High surface alumina is the preferred binder. Typically the amount of binder is from 5 to 50, and preferably from 10 to 40 and most preferably 15 to 35 weight percent based on the weight of the upstream catalyst composition.

Preferred compositions of the present invention comprise, based on the upstream catalyst composition, from 0 to 75, preferably 25 to 75, and more preferably 25 to 60 wt. % ceria; from 0 to 60, preferably 20 to 60, and more preferably 25 to 60 wt. % zeolite; and 5 to 50, and preferably from 10 to 40 and most preferably 15 to 35 wt. % binder. A preferred composition comprises 30 to 35 wt. % ceria; 30 to 35 wt. % zeolite; and 30 to 35 wt. % binder.

The catalyst of this invention can optionally comprise at least one precious metal component in an amount sufficient to provide compositions having significantly enhanced catalytic activity to oxidize particulate matter, VOF's and gaseous hydrocarbons and carbon monoxide and reduce nitrogen oxides. As used herein, the term "precious metal components" include gold, silver and "platinum group metal component" including platinum, rhodium, platinum, ruthenium and iridium components and means any such platinum group metal compound, complex, or the like which, upon calcination or use of the catalyst decomposes or otherwise converts to a catalytically active form, usually, the metal or the metal oxide. The platinum group metal component can on particles which are separate from the ceria and zeolite particles, preferably a platinum or palladium metal component, with dispersed platinum carried on the catalytic material in an amount of from about 0.1 to about 60, e.g., 0.1 to 15, preferably 0.1 to 5 g/ft³ or dispersed palladium carried on the catalytic material in an amount of from about 0.1 to about 200, e.g., 20 to 120, preferably 50 to 120 g/ft³.

The preferred precious metal component of the specific catalyst composition is preferably a platinum or platinum/rhodium component which is typically used as a layer to coat a monolithic honeycomb substrate. The total precious metal component loading based on grams of precious metal per volume of monolith is from 5 to 400 g/ft$^3$, preferably 15 to 250 g/ft$^3$, preferably from 10 to 150 g/ft$^3$ and more preferably from 25 to 100 g/ft$^3$. The loading on the refractory oxide support is preferably from 5 to 200 g/ft$^3$, more preferably from 5 to 100 g/ft$^3$ and most preferably from 20 to 75 g/ft$^3$. The loading on the zeolite is preferably from 3 to 100 g/ft$^3$, more preferably from 5 to 75 g/ft$^3$ and most preferably from 15 to 50 g/ft$^3$.

The support materials are preferably refractory oxide materials which are preferably selected from the group from including silica, alumina and titania compounds. Particularly preferred supports are activated, high surface area compounds selected from the group consisting of alumina, silica, titania, zirconia, silica-alumina, alumina-zirconia, alumina-chromia, alumina-ceria zirconium-silicate and titanium-alumina.

The support preferably comprises a high surface area refractory oxide support. Typically, the particles of the support have at least 90% of the particles having an average diameter of less than 15 microns and more typically the support has 90% of the particles having an average diameter of less than 10 micrometers. For the purpose of the present invention, particle size is measured using a Brinkman particle size analyzer. The particle size distribution is indicated by a percent of particles having an average particle diameter less than a given number in micrometers. Nominally, particles of the combination of precious metal and other components supported on a support are considered to have the same particle size as the support.

Useful high surface area supports include one or more refractory oxides. These oxides include, for example, silica and alumina, titania and zirconia include mixed oxide forms such as silica-alumina, aluminosilicates which may be amorphous or crystalline, alumina-zirconia, alumina-chromia, alumina-ceria, ceria-zirconia and the like and titanium-alumina and zirconium-silicate. The support is preferably comprised of alumina which preferably includes the members of the gamma or transitional alumina, such as gamma and eta aluminas, and, if present, a minor amount of other refractory oxide, e.g., about up to 20 weight percent. Desirably, the active alumina has a specific surface area of 60 to 350 m$^2$/g, and typically 90 to 250 m$_2$/g.

When a precious metal component is used, the precious metal component used to form the supported precious metal, such as a platinum group metal catalytic component, can be a suitable compound, and/or complex of any of the platinum group metals to achieve dispersion on the support. Water soluble compounds or water dispersible compounds or complexes of one or more platinum group metal components may be utilized as long as the liquid used to impregnate or deposit the catalytic metal compounds onto the support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, amine solubilized platinum hydroxide such as hexahydroxymonoethanolamine complexes of platinum, $((MEA)_xPt(OH)_6)$ rhodium chloride, rhodium nitrate, hexamine rhodium chloride, palladium nitrate or palladium chloride, etc. During the calcination step, or at least during the initial phase of use of the catalyst, such compounds are converted into a catalytically active form of the platinum group metal or a compound thereof, typically an oxide.

Alternatively, precious metal can be present in the form of a precious metal doped zeolite. At least a desired percent of the zeolite can be doped with a precious metal, or there can be a second zeolite is preferably doped with a precious metal. The second zeolite can preferably be doped with at least one precious metal selected from the group consisting of Pt and Rh.

In specific and preferred embodiments, the second zeolite is characterized by general formula (I) wherein $M^2$ comprises a trivalent metal. Preferably, the second zeolite is characterized by general formula (I) wherein $M^2$ comprises at least one metal selected from the group consisting of Al, B, Ga, In, Fe, and $M^1$ is selected from the group consisting of hydrogen and/or at least one metal selected from the group consisting of Mg, Cr, Sr, Ba, Mn, Fe, Co, Ni, Cu, Rh, and Pt with at least one of Pt, Pd and Rh included. More preferably, the second zeolite is selected from the group consisting of faujasites, pentasils, mordenites with beta and ZSM-5 where said second zeolite is doped with at least one precious metal.

The composition optionally and preferably comprises a component which imparts stabilization. The stabilizer can be selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the composition of the present invention preferably use alkaline earth metal components. The alkaline earth metal components are preferably alkaline earth metal oxides. In particularly preferred compositions, it is desirable to use strontium oxide and/or barium oxide as the compound in the composition. The alkaline earth metal can be applied in a soluble form which upon calcining becomes the oxide. It is preferred that the soluble barium be provided as barium nitrite or barium hydroxide and the soluble strontium provided as strontium nitrate or acetate, all of which upon calcining become the oxides. The amount of stabilizer can be from 0.05 to 30 weight percent based on the weight of the support material and stabilizer.

The composition can contain a zirconium compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

The composition preferably contains at least one promoter selected from the group consisting of praseodymium metal components and neodymium metal components with the preferred components being praseodymium oxide (praseodymia) and neodymium oxide (neodymia). While these compounds are disclosed to act as stabilizers, they can also act as reaction promoters. A promoter is considered to be a material which enhances the conversion of a desired chemical to another. The promoter enhances the catalytic conversion of carbon monoxide and hydrocarbons into water and carbon dioxide and nitrogen oxides into nitrogen and oxygen. The praseodymium compound may also provide as an oxygen storage function.

The praseodymium and/or neodymium components are in the form or their oxides. Preferably, these compounds are initially provided in a soluble form such as an acetate, halide, nitrate, sulfate or the like to impregnate the solid components for conversion to oxides. It is preferred that in the promoter be in intimate contact with the other components in the composition including and particularly the platinum group metal.

The catalyst composition can be coated as one or more layers on a monolithic substrate generally which can comprise a loading of from about 0.50 to about 5.0, preferably about 0.5 to about 3.0 g/in$^3$ of catalytic composition per layer based on grams of composition per volume of the monolith.

The catalyst composition of the present invention can be made by any suitable method. A preferred method comprises mixing a mixture of water, a zeolite and/or a cerium component, a bomder and high surface area, refractory oxide to form a first slurry.

Optionally, a solution of at least one water-soluble, precious metal component, and finely-divided, which is sufficiently dry to absorb essentially all of the solution to form a second slurry. The precious metal component is preferably comminuted in the second slurry can be added to the first slurry containing the zeolite and/or cerium component to form a washcoat slurry. In particularly preferred embodiments the washcoat slurry is comminuted to result in substantially all of the solids having particle sizes of less than about 15 micrometers in average diameter. The supported precious metal component in the resulting slurry can be converted to a water insoluble form by a fixing step. The precious metal component can be converted to insoluble form thermally, chemically or by calcining. The precious metal can be thermally fixed to the support in air at preferably at about 50° C. to 550° C. for from 0.5 to 2.0 hours.

The second slurry useful for the present compositions can also be prepared by the method in disclosed in U.S. Pat. No. 4,134,860 (incorporated by reference).

Upstream Catalyst Carrier

In making catalysts by this invention, the upstream catalyst composition useful in the present invention can be deposited on a macrosize carrier, preferably of low total surface area. The carrier used in this invention should be relatively inert with respect to the catalytic composition dispersed thereon. Different compositions made in accordance with the present invention can be applied in separate layers. Thus the carrier may be dipped or sprayed with the complete slurry, until the appropriate amount of slurry is on the carrier. The slurry employed in depositing the catalytically-promoting metal component-high area support composite on the carrier will often contain about 20 to 60 weight percent of finely-divided solids, preferably about 35 to 45 weight percent. Alternatively, the catalyst composition can be used in the form of a self-supporting structure such as a pellet. The composition can be prepared and formed into pellets by known means.

The comminuted catalytically-promoting metal component-high surface area support composition can be deposited on the carrier such as a metal, ceramic honeycomb or foam substrate in a desired amount. For example, the composite may comprise about 2 to 30 weight percent of the coated carrier, and preferably about 5 to 20 weight percent. The composition deposited on the carrier is generally formed as a coated layer over most, if not all, of the surfaces of the carrier contacted. The combined structure may be dried and calcined, preferably at a temperature of at least about 250° C., but not so high as to unduly destroy the high area of the refractory oxide support, unless such is desired in a given situation.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. Depending on the composition of the exhaust gas the number of cells may be varied. For example, if the exhaust gas contains greater amounts of particulate matter a lower cell per inch flowthrough carrier may be chosen e.g., having 60 to 400 or 60 to 250 cells per inch. The ceramic carrier may be made of any suitable refractory material, for example, cordierite, cordierite-alpha alumina, silicon nitride, zircon mullite, spodumene, alumina-silica magnesia, zirconium silicate, magnesium silicates, zircon, petalite, alpha alumina and aluminosilicates. The metallic honeycomb may be made of a refractory metal such as a stainless steel or other suitable iron based corrosion resistant alloys.

The carriers useful for the catalysts made by this invention may be metallic in nature and be composed of one or more metals or metal alloys. The metallic carriers may be in various shapes such as pellets or in monolithic form. The metallic honeycomb may be made of a plurality of matallic elements, such as alternating layers of flat and corrugated matal foil. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 1 to 8 weight percent of aluminum and 0 to about 20 weight percent of nickel. The preferred alloys may contain small or trace amounts of one or more other metals such as molybdenum, copper, silicon, niobium, titanium and the like. The surfaces of the metal carriers may be oxidized at quite elevated temperatures, e.g. at least about 800° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Downstream Filter

The downstream filter can be any suitable filter element of the type known to filter particulate matter in engine exhaust steams. Useful filters include: wallflow filters; foam; wound fiber filters; ceramic fiber felt, knit or weave filters; and mesh filters, with a wallflow filter being preferred.

Wall-flow carriers are generally similar in structure to flow-through carriers, with the distinction that each channel is blocked at one end of the carrier body, with alternate channels blocked at opposite end-faces. Wall-flow carrier substrates and the washcoat coatings deposited thereon are necessarily porous, as the exhaust must pass through the walls of the carrier in order to exit the carrier structure.

As used herein and in the claims, reference to a "ceramic" or "foamed ceramic" wallflow article means and includes conventional filter type articles of the type made from cordierite, mullite, alumina and/or other refractory metal oxides conventionally used for this purpose. The element may be formed of any porous material which is able to withstand the environment(s), particularly high temperatures, encountered in treating the fluid streams of interest. In the practice of the present invention, the filter may be catalyzed and can be placed in a housing which directs the fluid stream to be treated through the inlet to the inlet side of the element. The fluid passes through the porous wall comprising a catalyst to the outlet side and out of the outlet. Preferred catalytic articles, which are useful for the purposes of this invention include thin, porous-walled honeycomb (monolith) or foam structures through which the fluid stream passes without causing too great an increase of back pressure or pressure drop across the article. Normally, the presence of a clean wallflow article will create a backpressure of 1 inch water column to 10 psig. Wallflow articles can contain slotted channels separated by parallel walls, sinusoidal channels composed of alternating flat and sinusoidal sheets, or parallel channels having rectangular, square, circular, oval, triangular, hexagonal, or other polygonal cross sections. Preferably, wallflow articles of this type comprise a plurality of square channels with between 8 and 600 channels per square inch of cross section, a wall thickness of between 0.002 and 0.1 inches, and a water absorption pore volume of between 10% and 70% by weight. Preferred configurations are between 50 and 200 channels per square inch, a wall thickness of between 0.007 and 0.03 inches, and a water absorption pore volume of between 15% and 50%. Particularly useful for the purposes of this invention are the variety of prior art diesel engine exhaust particulate filters which may be catalyzed in accordance with the practice of the present invention such as disclosed in the Background of the Invention. U.S. Pat. Nos. 4,329,162, and 5,100,632 as well as other patents cited above in the Background of the Invention and are herein incorporated by reference with respect to the disclosure of suitable filter elements.

The porous wallflow article used in this invention is preferbly catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

Particulate filters can be catalyzed using filter catalysts disclosed in the art. The filter can comprise a refractory wallflow carrier or substrate having a plurality of porous passages extending therethrough and defined by passage walls on which the present a catalytic washcoat. Useful catalytically active materials in filter catalyst compositions are described in references listed above in the Background of the Invention and are herein incorporated by reference. Preferred filter catalysts comprise at least one catalytically active material selected from cerium components, zeolite components, and platinum group metal components. Platinum carried on the catalytic material can be in an amount of from about 0.1 to about 100, e.g., 0.1 to 75, preferably 0.1 to 50 $g/ft^3$ or dispersed palladium carried on the catalytic material in an amount of from about 0.1 to about 200, e.g., 20 to 120, preferably 50 to 120 g/ft3.

Generally, a slurry of particles of the present composition will be deposited upon the carrier substrate and dried and calcined to adhere the catalytic material to the wallflow carrier. When the catalytic material or any component is applied to a suitable honeycomb carrier, such as described above, the amount of the component is conventionally expressed herein and in the claims as weight of component per unit volume of catalyst, as this measure accommodates the presence of different sizes of catalyst composition voids provided by different carrier wall thicknesses, gas flow passage dimensions, etc. Grams per cubic inch ("$g/in^3$") units are used herein and in the claims to express the quantity of relatively plentiful components such as the zeolite material, and grams per cubic foot ("$g/ft^3$") units are used to express the quantity of the sparingly-used ingredients, such as the platinum metal. For typical diesel exhaust applications, the catalytic material of the present invention generally may comprise from about 0.25 to about 4.0 $g/in^3$, preferably from about 0.25 to about 3.0 $g/in^3$ of the coated carrier substrate.

Alternatively, water soluble components such as water soluble cerium, zirconium and/or precious metal salts can be impregnated into a suitable substrate or refractory oxide layers.

EXAMPLES

Example 1

Engine bench testing has been conducted to determine the soot burning or regeneration performance of various soot filter configurations when operated with a MY'97 Cummins L-10 diesel engine. This engine had high total particulate emissions (>0.7 g/hp-hr) over the US HD Transient Test and was representative of certain pre-Euro I engines which were the subject of retrofit with soot filters. Balance Point Temperature (BPT) Tests were run to determine soot burning/filter regeneration behavior, with lower BPT's showing better performance. The BPT performance was determined at three speeds (1300, 1700 and 2100 RPM) in the engine speed range.

Figure 5:
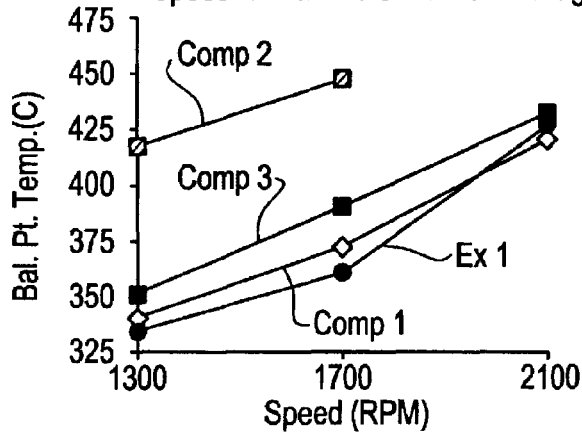
FIG. 5 presents graphs of balance point temperatures (°C.) versus engine speed of Example 1.

The BPT's for several soot filter configurations is shown in FIG. 5, below, which can be used to demonstrate the effect of an upstream filter on enhanced performance for this high emissions engine. Upstream catalysts were coated onto flowthrough ceramic honeycombs 6 inches long by 9.5 inches in diameter and having 300 cells per square inch. The soot filters were ceramic wallflow honeycomb 14 inches long by 11.25 inches in diameter and having 100 cells per square inch.

FIG. 5 shows the general trend of higher BPT for a given soot filter configuration with higher engine speed. This is due to higher exhaust mass emissions a higher speed, and therefore higher soot accumulation rates, requiring higher temperatures to attain a matching soot burning rate by the soot filter catalyst to achieve the balance point (zero change in ($\Delta P$), pressure drop measured across the filter, with time).

The BPT's for a comparative system, Comparative 1, comprised of a high Pt loaded (200 $g/ft^3$) upstream flowthrough catalyst mounted upstream of an uncatalyzed soot filter substrate is shown as a control. The fuel used in Comparative 1 had less than 10 ppm sulfur. In such systems soot burning and thereby regeneration of the filter with system is attributed by U.S. Pat. No. 4,902,487 to oxidation of engine-out NO to $NO_2$ thus providing a more active, lower temperature oxidant than $O_2$ for soot combustion.

An evaluation of catalyzed soot filters having no upstream catalysts, Comparatives 2–3, show that the BPT's can be lowered for this engine by increasing the Pt loading (5 g/ft$^3$ to 50 g/ft$^3$) on the soot filter substrate. Comparative 2 contained 500 g/ft$^3$ of ceria; and Comparative 3 contained 500 g/ft$^3$ of ceria and 250 g/ft$^3$ of zirconia. A sample of Comparative (not shown on graph) without zirconia did not perform as well as Comparative 3 but performed better than Comparative.

Example 1, a low Pt loaded flowthrough (5 g/ft$^3$ Pt, 0.84 g/in$^3$ gamma-alumina, 0.83 g/in$^3$ bulk Ce, and 0.83 g/in$^3$ iron doped Beta zeolite), was placed in the exhaust upstream of the Comparative 3 soot filter (50 g/ft$^3$ Pt). This resulted in a significant and further lowering of the BPT's at both 1300 and 1700 RPM. The reason for this performance is attributed primarily to conversion of engine-out total particulate matter, mainly the VOF, by the flowthrough catalyst, in turn, results in a lower particulate mass accumulation rate at the downstream catalyzed soot filter and thereby lower BPT's. The fuel used in Example 1 and Comparatives 2 and 3 had more than 350 ppm sulfur.

The results showed that an upstream catalyst in front of the catalyzed soot filter gave better performance than the catalyzed soot filter alone when run on this high particulate emissions engine. The mechanism is believed to include the conversion of VOF and thereby lowering of the particulate accumulation rate on the catalyzed soot filter.

Examples 2–4

Laboratory bench reactor tests were conducted on flowthrough upstream catalyst samples to determine their activity for converting NO to $NO_2$.

The experiments were run using cores of catalyst coated onto honeycomb substrates (1.5" dia.×6" long, 300 cpsi). The feed gas to the reactor was comprised of NO at 200 rpm, CO at 500 ppm, HC as $C_{10}H_{22}$ at 200 ppm as $C_1$, $O_2$ at 10%, $H_2O$ at 5%, $CO_2$ at 5% and the balance $N_2$. One set of experiments was run with this feed gas and a second set was run in which 20 ppm $SO_2$ was also incorporated into the feed gas to determine its effect on NO to $NO_2$ conversion. The gas flow in the reactor was set to give a GHSV (gas hourly space velocity) of 25,000 hr–1. For the test runs the temperature was ramped from ca. 100° C. to 500° C. and the conversion of NO to $NO_2$ was monitored by means of FTIR.

The following upstream catalyst samples were tested:
1. Comparative 1;
2. Example 1, 5 g/ft$^3$ Pt on gamma-alumina;
3. Example 2, Pt loading of 90 g/ft$^3$, 1.5 g/ft$^3$ gamma-alumina and 1.5 g/in$^3$ H-Beta zeolite;
4. Example 3, same as Example 1 with a Pt loading of 0.5 g/ft$^3$; and
5. Example 4, 1.10 g/in$^3$ gamma-alumina, plus 0.10 g/in$^3$ NGL-5 ceria, plus 0.80 g/in$^3$ Fe-Beta zeolite, Pt-free.

Figure 6:
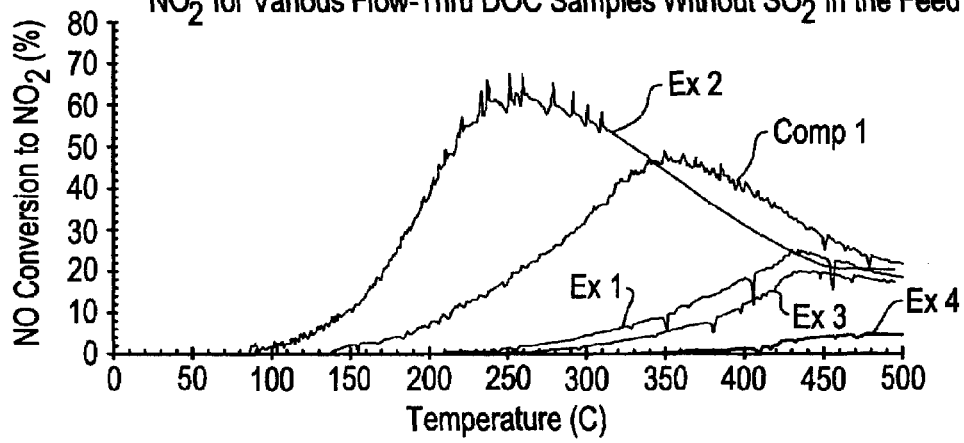
FIGS. 6 and 7 present graphs of NO conversion to $NO_2$ versus exhaust gas temperatures (°C.) of Examples 2–4.

The reactor test results for the runs which used the $SO_2$-free feed gas are shown in FIG. 6.

Highly Pt-loaded samples Comparative 1 and Example 2 exhibit very high conversion levels ca 50–60% with light-off between 100° C. and 150° C. Surprisingly, Example 2 with 90 g/ft$^3$ exhibited higher activity for conversion of NO to $NO_2$ than did the 200 g/ft$^3$ Pt on alumina. This might be due to better dispersion of the Pt. The upstream catalysts with lower Pt loadings, Examples 1, 3 and 4 exhibited much lower activity for conversion of NO to $NO_2$. The results suggest a Pt loading dependence on the conversion of NO to $NO_2$. The Pt-free DOC gave the lowest level of $NO_2$ conversion.

Figure 7:
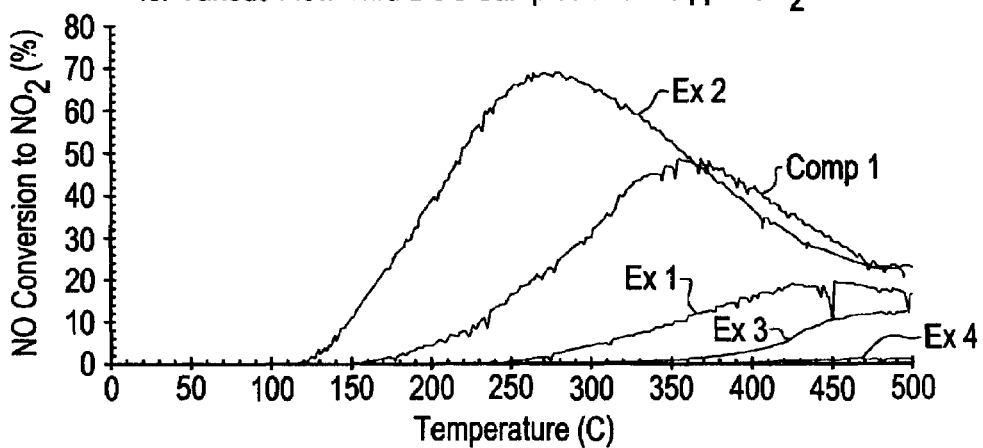

The reactor runs with the addition of 20 ppm $SO_2$ in the feed gas gave the conversion results shown in FIG. 7. As can be seen the conversion of NO to $NO_2$ by the high Pt loaded samples was similar to the runs without $SO_2$ in the feed gas. Example 2 even exhibited slightly higher conversion with $SO_2$ in the feed than without it. This was somewhat surprising because the presence of $SO_2$ was expected to inhibit the NO to $NO_2$ conversion. The presence of $SO_2$ in the feed did have an inhibiting effect on the conversion of NO to $NO_2$ on the other upstream catalyst samples. Based on these results it was expected that a PM-free upstream catalyst might be a good candidate to enhance catalyzed soot filter performance for soot burn-off and filter regeneration (low BPT's) and at the same time give little or no conversion of engine-out NO to $NO_2$.

Example 5

Tests on upstream flowthrough catalysts were conducted using full size catalysts evaluated on an engine dynamometer test bench. The engine used was a MY-98 Caterpillar Model 3126 (7.2 liter) engine rated at 300 HP at 2200 RPM. The CAT 3126 was calibrated for 7 g/hp-hr NOx over the US HD Transient Test. The initial test runs were conducted using a modified Euro III (OICA) test cycle. The OICA test cycle consists of 13 speed and load conditions. The engine exhaust temperatures obtained over the OICA cycle ranged mainly between ca. 300° C. and ca. 450° C. For the purposes of this test 3 additional 10% load modes were incorporated at the end of the OICA test cycle to give lower temperature conditions (200–300° C.).

Over this "Modified OICA" test cycle the exhaust was monitored using FTIR which allowed the quantitative measurement of both NO and $NO_2$ levels with the sum being total NOx. In this way the $NO_2$ to total NOx level in the exhaust ($NO_2$/NOx) could be determined and expressed as a percentage. A test cycle run was conducted in which the engine-out $NO_2$/NOx was measured. In subsequent runs the $NO_2$/NOx in the exhaust was measured for the outlet of flowthrough upstream catalysts having the same upstream catalyst compositions as Comparative 1 (200 g/ft$^3$ Pt on gamma-alumina) and Examples 1 (5 g/ft$^3$ Pt on gamma-alumina) and Example 3 (0.5 g/ft$^3$ Pt on gamma-alumina). Example 5 having the same composition as Example 4 (1.10 g/in$^3$ gamma-alumina, plus 0.10 g/in$^3$ NGL-5 ceria, plus 0.80 g/in$^3$ Fe-Beta zeolite, with 0.0 g/ft$^3$ Pt) was also tested. The tested upstream catalysts were on ceramic flowthrough carriers with a size for the testing of 9.5" dia.×6.0" long with 300 cpsi. The engine-out percentage of $NO_2$/NOx was found to be very low over the modified OICA cycle with only ca. 3–8% $NO_2$ present in the total NOx. By comparison the Comparative 1 flowthrough catalyst (200 g/ft$^3$ Pt) exhibited high level $NO_2$ conversion. For the majority of the test cycle with the Comparative 1 sample the $NO_2$/NOx ranged between ca. 40% and nearly 80%, with one peak of over 90% and minimums no lower than ca. 20–25%. Example 1 with 5.0 g/ft$^3$ gave a maximum $NO_2$/NOx level of ca. 56%, but with the exception of three other peaks ran for the majority of the cycle with a $NO_2$/NOx level below 20%. Example 3 with 0.5 g/ft$^3$ Pt exhibited lower $NO_2$/NOx levels and ran for the most part at 10% or below with only several peaks near or above 20%. Example 5, Pt-free sample gave the lowest NO$_2$/NOx level, and ran below the engine-out level for the majority of the test cycle.

The engine test results showed that the upstream catalysts gave substantially lower NO$_2$/NOx levels than the Comparative 1. However, those samples containing Pt, even at low loadings, gave NO$_2$/NOx levels which exceeded the engine-out level. Only the Pt-free upstream catalyst gave NO$_2$/NOx levels below or comparable with the engine-out level.

Example 6

Example 6 is an upstream catalyst which comprised of gamma-alumina and ceria and contained no PM. Example 6 was tested with the CAT 3126 engine. The Example 6 composition contained 1.36 g/ft$^3$ of bulk ceria and 1.59 g/ft$^3$ of bulk gamma-alumina. For this test an upstream ceramic flowthrough catalyst was evaluated in combination with a ceramic wallflow catalyzed soot filter sample which had 75 g/ft$^3$ Pt. The soot filter catalyst was coated on a wallflow substrate of 10.5" dia.×12.0" long dimensions with 100 cpsi cell spacing. Test runs were made using the modified OICA cycle and the NO$_2$/NOx percentage was determined using FTIR for the engine-out exhaust, at the upstream catalyst outlet position and at the downstream soot filter outlet position.

Consistent with the results of the prior modified OICA cycle tests, the engine-out NO$_2$/NOx percentage level ran between 3% and 8%. The Pt-free upstream catalyst of Example 6 sample gave a NO$_2$/NOx level, which was comparable with Example 3 with 0.5 g/ft$^3$ Pt and not comparable with the Pt-free, Example 5 which contained 1.10 g/in$^3$ gamma-alumina and 0.1 g/in$^3$ bulk ceria. The outlet NO$_2$/NOx ratio for Example 6 ran 5–20% for most of the test cycle with the exception of one major and three minor peaks between 20 and 30%. This showed that there appeared to be more than Pt loading level which had contributed to the conversion of NO$_2$ to give an NO$_2$/NOx level above that of engine-out.

At this stage it appears that the conversion of NO to NO$_2$ over Pt-free Example 6 upstream catalyst has to be attributed to the ceria oxidation function. This was not an anticipated result. Furthermore, the significantly lower NO$_2$/NOx levels found for Pt-free Example 5 can most likely be attributed to its very low ceria loading (ca. 0.10 g/ft$^3$) which was less than $\frac{1}{15}^{th}$ that of Example 6. The VOF conversion of Example 5 is believed to be primarily a function of the Fe-Beta zeolite component and not ceria.

While the invention has been described in detail with respect to specific preferred embodiments thereof it will be appreciated that variations thereto may be made which nonetheless lie within the scope of the invention and the appended claims.

What is claimed:

1. A method for treating a diesel engine exhaust stream containing particulate matter comprising the steps of:
    contacting the stream with an upstream catalytic composition comprising an acidic zeolite component to reduce the quantity and amount of the particulate matter;
    passing the stream from the upstream catalytic composition to a particulate filter located downstream from the upstream catalytic composition.
2. The method as recited in claim 2 wherein the diesel engine exhaust stream further comprises nitrogen oxides, carbon monoxide, gaseous hydrocarbons, the upstream catalyst component further comprises at least one precious metal catalyst component; and the method further comprises:
    reducing at least some of the nitrogen oxides to nitrogen in the presence of the precious metal component; and
    oxidizing the hydrocarbons and carbon monoxide.
3. The method as recited in claim 1 wherein the zeolite is characterized by general formula:

$$M^1n\ [mM^2O_2.nSiO_2].qH_2O$$

in which
    $M^1$ is an equivalent of an exchangeable cation corresponding in number to the $M^2$ component;
    $M^2$ is a trivalent element which, together with the Si, forms the oxidic skeleton of the zeolite;
    n/m is the SiO$_2$ to $M^2O_2$ ratio and
    q is the quantity of absorbed water.
4. The method as recited in claim 3 wherein $M^2$ comprises at least one metal selected from the group consisting of Al, B, Ga, In, Fe, Cr, V, As and Sb and $M^1$ is selected from the group consisting of hydrogen and at least one metal selected from the group consisting of Li, Na, K, Rb, Cs, Mg, Ca, Sr, Ba, Cr, Mn, Fe, Co, Ni, Cu, Nb, Ma, Ta, W, Re, Pt, Pd, and Rh.
5. The method as recited in claim 4 wherein $M^2$ comprises at least one metal selected from the group consisting of Al, B, Ga, In, Fe, Cr, V and Sb, and $M^1$ is selected from the group consisting of hydrogen and at least one metal selected from the group consisting of Rh and Pt.
6. The method as recited in claim 5 wherein $M^2$ comprises at least one metal selected from the group consisting of Al, B, Ga, In, Fe, Cr, V, As and Sb, and $M^1$ comprises hydrogen ion.
7. The method as recited in claim 3 wherein $M^2$ comprises a trivalent metal and $M^1$ comprises substantially no precious metal.
8. The method as recited in claim 7 wherein $M^2$ comprises aluminum.
9. The method as recited in claim 3 wherein the zeolite is selected from the group consisting of faujasites, pentasils, mordenites, Y.
10. The method as recited in claim 3 wherein the zeolite is acidic and has 50–100 of $M^1$ replaced by hydrogen ions.
11. The method as recited in claim 1 wherein the upstream catalyst composition further comprises a binder.
12. The method as recited in claim 1 wherein the upstream catalyst composition comprises ceria.
13. The method as recited in claim 12 wherein the ceria comprises bulk ceria.
14. The method as recited in claim 1 wherein the upstream catalyst composition contains essentially no platinum group metal components.
15. The method as recited in claim 1 wherein the particulate filter is catalyzed with a filter catalyst.
16. The method as recited in claim 15 wherein the filter catalyst comprises at least one catalytically active material selected from cerium components, zeolite components, and platinum group metal components.
17. The method as recited in claim 1 wherein the upstream catalyst comprises further comprises at least one compound selected from alumina, titania, zirconia, alkaline earth metal oxides, rare earth oxides and transition metal oxides.
18. method as recited in claim 2 wherein the upstream catalyst composition further comprises a support component.
19. The method as recited in claim 18 wherein the support component comprises a refractory oxide.
20. The method as recited in claim 18 wherein the support comprises a compound selected from titania, zirconia, and silica containing components.

21. The method as recited in claim 18 wherein the at least one precious metal component is located on the support component.

22. The method as recited in claim 21 wherein the at least one precious metal component is selected from platinum, palladium and rhodium.

23. The method as recited in claim 1 wherein the upstream catalyst composition is supported on an upstream catalyst carrier.

24. The method as recited in claim 23 wherein the upstream catalyst carrier is selected from flowthrough, foam and mesh substrates, and the filter is selected from a wall-flow filter; foam filter; wound fiber filter; ceramic fiber felt filter, knit or weave filters; and mesh filter.

\* \* \* \* \*